United States Patent [19]
Suenaga et al.

[11] Patent Number: 5,234,679
[45] Date of Patent: Aug. 10, 1993

[54] METHOD OF REFINING TUNGSTEN HEXAFLUORIDE CONTAINING MOLYBDENUM HEXAFLUORIDE AS AN IMPURITY

[75] Inventors: Takashi Suenaga; Mitsuya Ohashi; Takashi Yoneda; Yoshiyuki Kobayashi, all of Yamaguchi, Japan

[73] Assignee: Central Glass Company, Limited, Ube,, Japan

[21] Appl. No.: 866,347

[22] Filed: Apr. 10, 1992

[30] Foreign Application Priority Data

May 17, 1991 [JP] Japan .................................. 3-113094

[51] Int. Cl.$^5$ ................................................. C01B 9/08
[52] U.S. Cl. ............................. 423/489; 423/240 S; 423/53; 423/59
[58] Field of Search .................. 423/8, 53, 492, 60, 423/59, 489, 240 S

[56] References Cited

U.S. PATENT DOCUMENTS 3,711,592  1/1973  Jönsson et al. .................. 423/60
3,806,579  4/1974  Carles et al. .................... 423/19

FOREIGN PATENT DOCUMENTS 02124723  5/1990  Japan .

Primary Examiner—Theodore Morris
Assistant Examiner—Edward Squillante
Attorney, Agent, or Firm—Keck, Mahin & Cate

[57] ABSTRACT

A method of refining tungsten hexafluoride containing molybdenum hexafluoride as an impurity includes the step of contacting the tungsten hexafluoride with at least one metal selected from the group consisting of Mo, W, Cu, Ni, Fe, Co, Zn, Ti, Al, Ca and Mg at a temperature ranging from 100° to 500° C. Molybdenum hexafluoride is efficiently removed from the tungsten hexafluoride by the method.

1 Claim, No Drawings

METHOD OF REFINING TUNGSTEN HEXAFLUORIDE CONTAINING MOLYBDENUM HEXAFLUORIDE AS AN IMPURITY

BACKGROUND OF THE INVENTION

1. Field of the Invention

The present invention relates in general to a method of refining tungsten hexafluoride, and more particularly to a method of removing molybdenum hexafluoride as an impurity from tungsten hexafluoride.

2. Description of the Prior Art

There is an increasing demand for tungsten hexafluoride of very high purity. This type of tungsten hexafluoride is used, for example, as a material for sputtering target, conductive paste or semiconductor electrode.

According to one of conventional methods, tungsten hexafluoride is produced by the reaction of tungsten powder with fluorine gas. This tungsten powder is prepared by a so-called wet method in which tungsten oxide produced by hydrolysis of ammonium paratungstate is reduced to tungsten powder in the atmosphere of hydrogen. To produce tungsten hexafluoride of very high purity, it is necessary to prepare tungsten powder of very high purity. However, tungsten powder is inevitably somewhat contaminated with impurities derived from raw materials and/or reagents. Therefore, tungsten hexafluoride produced from tungsten powder is also inevitably contaminated with the impurities. Thus, it is necessary to refine tungsten hexafluoride, for example, through distillation. With this, most of impurities can be removed from tungsten hexafluoride by the difference therebetween in boiling point or vapor pressure. However, molybdenum which is one of the impurities of tungsten hexafluoride has melting and boiling points close to those of tungsten hexafluoride. In fact, melting points of tungsten hexafluoride and molybdenum hexafluoride are 2° C. and 17.5° C., and boiling points of those are 17.2° C. and 35° C., respectively. Furthermore, molybdenum hexafluoride has a very high vapor pressure even at a temperature under melting point thereof. Therefore, it is practically impossible to remove molybdenum hexafluoride from tungsten hexafluoride through distillation. Thus, it is usual that tungsten hexafluoride refined by a conventional manner contains a few ppm to several hundreds ppm of molybdenum hexafluoride. This contamination affects an electrical characteristic of tungsten hexafluoride, thereby deteriorating quality thereof as a final product.

SUMMARY OF THE INVENTION

It is therefore an object of the present invention to provide an improved method of refining tungsten hexafluoride, in which method molybdenum hexafluoride as an impurity can be efficiently removed from tungsten hexafluoride.

According to the present invention, there is provided a method of refining tungsten hexafluoride containing molybdenum hexafluoride as an impurity by contacting the tungsten hexafluoride with at least one metal selected from the group consisting of Mo, W, Cu, Ni, Fe, Co, Zn, Ti, Al, Ca and Mg at a temperature ranging from 100° to 500° C.

DESCRIPTION OF THE PREFERRED EMBODIMENTS

According to the above method of the invention, when the tungsten hexafluoride containing molybdenum hexafluoride as an impurity is contacted with at least one of the above metals at the above temperature range (100°–500° C.), molybdenum hexafluoride (gas) is selectively reduced by the metals (solid) in the solid-gas reaction to molybdenum pentafluoride and/or molybdenum trifluoride. However, at the above temperature range, molybdenum pentafluoride is immediately further reduced to molybdenum trifluoride. Thus, molybdenum hexafluoride is completely reduced to molybdenum trifluoride at the temperature range. Due to the high melting point of molybdenum trifluoride and the low vapor pressure, molybdenum trifluoride is stable as solid and deposited on the surface of the metals at the temperature range.

At the same time when molybdenum hexafluoride is reduced by the metals, the metals are oxidized by molybdenum hexafluoride to fluorides of the metals. These fluorides of the metals except tungsten are stable as solid at the temperature range. Thus, tungsten hexafluoride gas does not become contaminated with the fluorides. In case of tungsten, tungsten metal (solid) is oxidized to tungsten hexafluoride (gas), thereby not contaminating therewith the original tungsten hexafluoride gas which is to be refined.

It should be noted that, at the above temperature range, molybdenum hexafluoride (gas) as an impurity is reduced to molybdenum trifluoride (solid), but the original tungsten hexafluoride (gas) is not reduced by the above metals. Therefore, according to the invention, molybdenum hexafluoride can be removed from tungsten hexafluoride.

In the invention, if the tungsten hexafluoride is contacted with at least one of the above metals at a temperature lower than 100° C., molybdenum hexafluoride is not completely reduced by the above metals. That is, molybdenum hexafluoride can not be completely removed from tungsten hexafluoride. In contrast, if the tungsten hexafluoride is contacted at a temperature higher than 500° C., molybdenum hexafluoride is completely reduced by the above metals. However, at the same time, tungsten hexafluoride is partially reduced by the above metals, thereby lowering the yield of tungsten hexafluoride in the refining process.

In the invention, the above metals take the form of thin wire, grain, chip or the like for increasing the total surface area of the metals, thereby ensuring good contact between the metals and the original tungsten hexafluoride gas containing molybdenum hexafluoride as an impurity.

A suitable hollow column is packed with at least one of the metals. If the metals take form of powder, flow of the original gas is impeded. Therefore, this powdery form is not desirable to be employed in the invention.

In the invention, the amount of molybdenum hexafluoride to be removed from tungsten hexafluoride at a certain temperature depends on linear velocity of the original gas in the column, the surface area of the metals, and the axial length of the column packed with the metals. It is desirable to make the metals have a large surface area, thereby accelerating the solidgas contact reaction between the metals (solid) and molybdenum hexafluoride (gas). Thus, it is preferable that the metals take the above-mentioned forms to increase the surface area thereof.

If the linear velocity is too slow, the amount of molybdenum hexafluoride which is removed from the original gas per unit time becomes too small. In contrast, if the linear velocity is too fast, the column packed with the metals must be lengthened to completely reduce molybdenum hexafluoride by the metals. This lengthy column increases the production cost. Thus, in the invention, it is preferable to maintain the linear velocity at a range from 10 to 100 cm/min (reduced to 25° C. basis).

EXAMPLES 1-16

Apparatus for refining tungsten hexafluoride containing molybdenum hexafluoride as an impurity will be described in the following in accordance with Example 1.

A first column made of stainless steel was used for refining therein the original tungsten hexafluoride gas. The first column hollow cylindrical in shape had 25 mm inner diameter and 700 mm axial length. The first column was packed with molybdenum which takes the form of wire (1 mm diameter and 2-3 cm axial length), such that axial length of a major portion of the column packed with molybdenum was 650 mm. A flow rate regulator was connected to a gas inlet of the first column to regulate the flow rate of the original gas in the first column. A second column made of stainless steel was connected to an gas outlet of the first column for collecting therein the refined tungsten hexafluoride gas which has been passed through the first column. The second column hollow cylindrical in shape had 50 mm inner diameter and 500 mm axial length. It is optional to use other materials such as nickel and copper for the first and second columns.

According to Example 1, the following refining process will be taken.

The original tungsten hexafluoride gas which contains molybdenum hexafluoride gas as an impurity in the concentration of 200 ppm expressed as molybdenum was introduced into the first column through the flow rate regulator so as to contact the original gas with molybdenum metal (solid) at 100° C., and to remove molybdenum hexafluoride from the original gas. The flow rate of the original gas was maintained at 70 standard cubic centimeters per minute (SCCM) with the flow rate regulator. Then, the refined tungsten hexafluoride gas obtained by passing the original gas through the first column was introduced from the gas outlet of the first column into the second column. The second column was maintained at a temperature ranging from 20° to 30° C., such that the refined tungsten hexafluoride was collected therein. The refined tungsten hexafluoride which has been collected was sampled, and molybdenum concentration thereof was determined by a so-called chelate precipitation-X ray fluorescence method. Limit of detection by this method was 0.5 ppm. As shown in the Table, the molybdenum concentration of the refined tungsten hexafluoride was under the limit of detection. Thus, molybdenum hexafluoride as an impurity was substantially completely removed from the original tungsten hexafluoride gas in the first column.

Examples 2-16 are modifications of Example 1 with respect to the refining conditions (temperature of the first column, flow rate in the first column, and metal types) and the molybdenum concentration of the original tungsten hexafluoride as shown in the Table. Other operation conditions of Examples 2-16 were the same as those of Example 1.

According to Examples 1-16, besides molybdenum having the above form, the metals, as shown in the Table, having the following respective forms were employed.

tungsten: wire (5 mm diameter and 1 cm axial length);
copper: wire (1 mm diameter and 2-3 cm axial length);
nickel: spongy nickel having no specific dimensions;
iron: grain (1-2 mm particle size);
cobalt: grain (1-3 mm particle size);
zinc: grain (1-5 mm particle size);
titanium: spongy titanium having no specific dimensions;
aluminum: wire (1 mm diameter and 2-3 cm axial length);
calcium: grain (1-5 mm particle size); and
magnesium: grain (1-5 mm particle size).

In the Examples 1-16, the amounts of molybdenum hexafluoride which has been removed in the first column were from 150 to 300 g per $m^2$ of the surface area of the respective metals.

In the invention, it is optional that two or more metals of the above metals are mixed with each other and packed into the first column so as to refine tungsten hexafluoride.

COMPARATIVE EXAMPLES 1 AND 2

Unlike Examples 1-16, the temperature of the first column was maintained at 50° C. The flow rate, metal type and molybdenum concentration of the original tungsten hexafluoride are shown in the Table. Other operation conditions were the same as those of Example 1. The forms of the metals were the same as those of the corresponding metals which were used in Examples 1-16.

TABLE

| | Refining Conditions | | | Mo Concentration in WF6 | |
|---|---|---|---|---|---|
| | Temp. (°C.) | Flow Rate (SCCM) | Metal Types | Before Refinement (ppm) | After Refinement (ppm) |
| Ex. 1 | 100 | 70 | Mo | 200 | <0.5 |
| Ex. 2 | 300 | 70 | Mo | 200 | <0.5 |
| Ex. 3 | 400 | 230 | Mo | 200 | <0.5 |
| Ex. 4 | 200 | 230 | W | 3100 | <0.5 |
| Ex. 5 | 350 | 230 | W | 3100 | <0.5 |
| Ex. 6 | 460 | 230 | W | 3100 | <0.5 |
| Ex. 7 | 350 | 110 | Cu | 3100 | <0.5 |
| Ex. 8 | 350 | 70 | Ni | 3300 | <0.5 |
| Ex. 9 | 350 | 110 | Fe | 200 | <0.5 |
| Ex. 10 | 350 | 70 | Co | 3300 | <0.5 |
| Ex. 11 | 350 | 70 | Zn | 3300 | <0.5 |
| Ex. 12 | 350 | 70 | Ti | 3300 | <0.5 |
| Ex. 13 | 350 | 70 | Al | 3300 | <0.5 |
| Ex. 14 | 100 | 110 | Ca | 3300 | <0.5 |
| Ex. 15 | 350 | 110 | Ca | 3300 | <0.5 |
| Ex. 16 | 350 | 110 | Mg | 3300 | <0.5 |
| Com. Ex. 1 | 50 | 70 | Mo | 200 | 1.5 |
| Com. Ex. 2 | 50 | 230 | W | 3100 | 287 |

What is claimed is:
1. A method of refining tungsten hexafluoride gas containing molybdenum hexafluoride gas as an impurity, said method comprising the steps of:
   contacting said tungsten hexafluoride gas containing molybdenum hexafluoride gas with at least one metal which is in the form of a solid and selected from the group consisting of Mo, W, Cu, Ni, Fe, Co, Zn, Ti, Al, Ca and Mg at a temperature ranging from 100° to 500° C.,
   reducing the molybdenum hexafluoride gas to molybdenum trifluoride and, at the same time, oxidizing said at least one metal to metal fluoride and removing molybdenum trifluoride as a solid.

* * * * *